3,383,408
PROCESS FOR PREPARING (1-ALKYLALKYL) GUANIDINE SALTS
Thomas Andrew Lies, Montgomery Township, Somerset County, N.J., assignor to American Cyanamid Company, Stamford, Conn., a corporation of Maine
No Drawing. Filed Nov. 16, 1964, Ser. No. 411,550
6 Claims. (Cl. 260—501.14)

The present invention relates to an improved process for the preparation of higher alkyl, branched-chain guanidine salts and has for its principal object the provision for providing an improved procedure to substantially increase the yeld of higher alkyl, branched-chain guanidine salts useful as fungicides and bactericides.

In summary, the invention relates to the reaction of (a) a higher alkyl branched-chain alkyl amine of the structure:

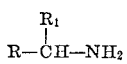

where R is an alkyl substituent containing from 7 to 17 carbon atoms and $R_1$ is a lower alkyl radical; (b) a lower alkanoic acid; and (c) cyanamide in substantially equimolar quantities at a temperature ranging from about 70° C. to about 150° C. in the substantial absence of an inorganic or organic solvent, and, thereafter, recovering a higher alkyl branched-chain guanidine salt in good yield and purity.

As described in United States Letters Patent 2,425,341 to Paden and MacLean, straight-chain guanidine salts can be prepared in good yield when reacting an aqueous cyanamide solution and an alkyl amine in the presence of a monocarboxylic acid. It is also known that the yield of guanidine salts resulting from the latter reaction can be markedly increased by employing a substantially iron-free, uncontaminated cyanamide reactant as disclosed in United States Letters Patent 3,004,065, issued to G. N. Gagliardi on Oct. 10, 1961. However, attempts to prepare higher alkyl, branched-chain guanidine salts, more specifically the 1-lower alkyl higher alkyl guanidine salts, have not been wholly satisfactory. To the present, known processes have resulted in the preparation of syrupy, difficult to handle, low yield mixtures from which desired guanidine salts are recovered in poor yield and purity. Since higher alkyl, branched-chain guanidine salts have been gaining in prominence in agriculture applications, a straightforward, economical method for obtaining commercially attractive yields of such salts would serve to fill the needs of the art.

Unexpectedly, increased commercially attractive yields of higher alkyl, branched-chain guanidine salts have been obtained by a process which, in brief, involves the reaction of cyanamide, a monocarboxylic acid and an amine in a reaction medium wherein little or no water is present. Where water is introduced prior to reaction usually in the form of an aqueous cyanamide solution, it is of critical import in order to obtain yields of 50% or better, that the water be removed as completely as possible as the reaction proceeds to its conclusion.

In general, the invention involves the reaction at temperatures between about 70° C. and 150° C. of cyanamide either in an aqueous menstruum or in anhydrous form with an higher alkyl, branched-chain amine in the presence of a lower alkanoic acid. The reaction can be graphically represented as follows:

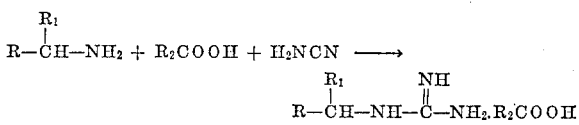

where R is an alkyl substituent of from 7 to 17 carbon atoms and $R_1$ and $R_2$ are each a lower alkyl radical of from 1 to 4 carbon atoms.

As illustrated in the above formula, the reactant proportions are substantially equimolar. However, a large molar excess of cyanamide or a small excess of the amine can be advantageously employed. Resultant guanidine monoalkanoic acid salt, can, if desired, be reacted with acids either organic or inorganic or the alkali metal salts thereof, to produce other corresponding guanidine salts. For instance, the reactions of an acetate salt with phthalic acid or p-toluene sulfonic acid or with sodium chloride yields the phthalate, or the p-toluene sulfonate, or the hydrochloride salt corresponding to the acetate salt, respectively.

Advantageously, any commercially available cyanamide whether or not contaminated as with iron, may be utilized in the process of the invention. When employing the commercially available aqueous cyanamide solutions, suitable means are provided for the withdrawal or removal of water continuously as soon as reaction commences. Should water be withdrawn after termination of the reaction, it is observed that the difficulties of the prior art practice with respect to yield and recovery of desired guanidine salt are experienced.

Removal of water from the reaction medium can be accomplished by a variety of means known to the art. For example, water can be swept from the reaction mixture with a gas which is inert to the mixture. Contemplated gases are argon, helium, nitrogen and carbon dioxide-free air. Exemplary of another means for the removal of water is the agitation of the mixture with any of the aforementioned inert gases introduced into the reaction medium through a draft tube reactor. Still another means for water removal involves the addition of benzene to the aqueous reaction mixture, whereby an azeotrope with water is formed.

Illustrative higher alkyl, branched-chain amines employed as reactants herein are: 1-methyldodecylamine, 1-methyltridecylamine, 1-ethyloctylamine, 1-methyldecylamine, 1-ethyldodecylamine and 1-ethylstearylamine. Similarly, exemplary lower alkanoic acids are: acetic acid, propionic acid, sec-butyric acid and n-butyric acid.

The invention will be further illustrated in conjunction with the following examples which are to be taken as illustrative and not by way of limitation. All parts are by weight unless otherwise noted.

Example 1

In a suitable reaction vessel a mixture of 11 parts of 1-methyldodecylamine and 3 parts of acetic acid in melt form is introduced, stirred and heated on an oil bath maintained at 121° C.–126.5° C. while adding dropwise over a period of 1 hour, 4.2 parts of cyanamide in the form of an aqueous solution. The latter solution is prepared by dissolving 4.2 parts of cyanamide in 12.6 parts of water. As soon as the introduction of the cyanamide solution is begun, a strong stream of nitrogen is played on the surface of the reaction mixture until no further moisture is detected in the effluent gas. This requires about 2½ hours.

After the addition of the cyanamide solution has been completed, heating and stirring of the mixture are continued for an additional 2½ hours. Resultant mixture is cooled to room temperature. To the mixture is then added 0.3 part of acetic acid and about 100 parts (by volume) of acetone. A solid is filtered off and dried. This solid is next recrystallized from a mixture of about 35 parts (by volume) of 2-propanol and 250 parts (by volume) of acetone. There is then obtained (1-methyldodecyl)guanidine acetate (melting point between 149.5° C. and 152° C.) in a 56% yield based on the amine reactant.

Example 2

A solution of 1-methyldodecyl amine (7.75 parts), acetic acid (1.30 parts) and 2-propanol (0.6 part) is stirred and heated at 92° C.–99° C. during the portionwise addition of a solution of cyanamide (2.76 parts) and acetic acid (0.72 part) in water (8.3 parts) over a period of 2.5 hours. Stirring and heating at 95° C.–98° C. are continued for 2 hours longer. The pH of the reaction solution is about 8. The reaction solution is next diluted with water to give a total solution volume of 75 parts by volume. Acetic acid (0.15 part) is also added and resultant solution is cooled and seeded with (1-methyldodecyl)-guanidine acetate. Crystalline precipitate of the latter acetate is collected and dried. Yield of desired (1-methyldodecyl)guanidine acetate having a melting point equal to 146° C.–153° C. is 31.5%.

Where seeding with (1-methyldodecyl)guanidine acetate is omitted in the recovery step, crystallized product is not obtained. Yield is adversely affected in this example.

Example 3

A molten solution containing 8.77 parts of 1-methyldodecylamine and 2.40 parts of acetic acid is introduced into a suitable reaction vessel and stirred gently while maintaining a temperature of 98° C.–100° C. during the addition of 3.55 parts of cyanamide containing 1.1% iron as ferric chloride hexahydrate. After the cyanamide has been added portionwise over a two hour period, the mixture is heated at about 100° C. for an additional three hours. The reaction mixture is cooled, whereby a hard yellow wax is obtained. The latter is mixed with 0.24 part of acetic acid and triturated with acetone to yield crude (1-methyldodecyl)guanidine acetate. The latter is next dissolved in a mixture of 25 parts (by volume) of acetone and 25 parts (by volume) of 2-propanol. Resultant solution is filtered. Solid residue is washed with two portions of the above acetone-propanol solvent mixture. The washes and filtrate are collected as a colorless solution which is diluted while hot with acetone. Next, the solution is seeded with (1-methyldodecyl)guanidine acetate and cooled, whereby resultant crystals are filtered off, washed with cold acetone and dried to yield 8.1 parts of colorless, crystalline (1-methyldodecyl)guanidine acetate having a melting point ranging between 152° C. and 153.5° C. From the mother liquor there is obtained 0.3 part of colorless crystalline product and both products amount to 8.4 parts, corresponding to a 63.4% yield of (1-methyldodecyl)guanidine acetate, based on the amine reactant employed.

Substituting in the foregoing example 1-ethyldodecylamine for 1-methyldodecylamine while employing commercially available anhydrous cyanamide and repeating the example in every substantial detail, a 73% yield of (1-ethyldodecyl)guanidine acetate having a melting point equal to 157.5° C.–158.5° C. is obtained.

Example 4

Repeating the procedure of Example 3 in every detail except that propionic acid is employed in lieu of acetic acid, the corresponding propionate salts are obtained in good yield and purity.

I claim:

1. A process for the preparation of higher alkyl branched-chain guanidine salts which consists in the steps of: reacting at a temperature ranging from about 70° C. and about 150° C. in substantially equimolar quantities (a) a higher alkyl, branched-chain alkyl amine of the structure:

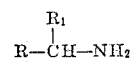

where R is an alkyl substituent containing from 7 to 17 carbon atoms and $R_1$ is a lower alkyl substituent, (b) a lower alkanoic acid and (c) an aqueous cyanamide solution, introducing an inert gas into said reaction medium during reaction to remove water therefrom, continuously removing water as reaction proceeds to completion and, thereafter, recovering resultant higher alkyl, branched-chain guanidine monoalkanoic acid addition salt in good yield and purity.

2. The method according to claim 1 wherein the water in the reaction medium is continuously removed by means of nitrogen stream.

3. The method according to claim 1 wherein the amine reactant is 1-methyldodecylamine.

4. The method according to claim 1 wherein the amine reactant is 1-ethyldodecylamine.

5. The method according to claim 1 in which the monoalkanoic acid is acetic acid.

6. The method according to claim 1 in which the monoalkanoic acid is propionic acid.

References Cited

UNITED STATES PATENTS 2,977,292  3/1961  Ellsworth _____ 203—4
3,157,695  11/1964  Lafont et al. _____ 260—510

LORRAINE A. WEINBERGER, *Primary Examiner.*

MARY WEBSTER, *Assistant Examiner.*